(12) United States Patent  (10) Patent No.: US 7,099,368 B2
Santhoff et al.  (45) Date of Patent: Aug. 29, 2006

(54) ULTRA-WIDEBAND COMMUNICATION THROUGH A WIRE MEDIUM

(75) Inventors: John Santhoff, Carlsbad, CA (US); Steve Moore, Escondido, CA (US)

(73) Assignee: Pulse-LINK, Inc., Carlsbad, CA (US)

( * ) Notice: Subject to any disclaimer, the term of this patent is extended or adjusted under 35 U.S.C. 154(b) by 50 days.

(21) Appl. No.: 10/855,172

(22) Filed: May 26, 2004

(65) Prior Publication Data

US 2004/0214522 A1 Oct. 28, 2004

Related U.S. Application Data

(63) Continuation-in-part of application No. 10/177,313, filed on Jun. 21, 2002.

(51) Int. Cl.
*H04B 1/69* (2006.01)

(52) U.S. Cl. .................................................. 375/130

(58) Field of Classification Search ................ 375/130, 375/256, 257, 259, 260; 342/202
See application file for complete search history.

(56) References Cited

U.S. PATENT DOCUMENTS

| | | | |
|---|---|---|---|
| 3,728,632 A | 4/1973 | Ross | |
| 4,641,317 A | 2/1987 | Fullerton | |
| 4,743,906 A | 5/1988 | Fullerton | |
| 4,813,057 A | 3/1989 | Fullerton | |
| 4,815,106 A | 3/1989 | Propp et al. | |
| 4,864,589 A | 9/1989 | Endo | |
| 4,979,186 A | 12/1990 | Fullerton | |
| 5,051,720 A | 9/1991 | Kittirutsunetorn | |
| 5,278,862 A | 1/1994 | Vander Mey | |
| 5,363,108 A | 11/1994 | Fullerton | |
| 5,485,040 A | 1/1996 | Sutterlin | |
| 5,491,463 A | 2/1996 | Sargeant et al. | |
| 5,523,760 A | 6/1996 | McEwan | |
| 5,554,968 A | 9/1996 | Lee | |
| 5,677,927 A | 10/1997 | Fullerton et al. | |
| 5,687,169 A | 11/1997 | Fullerton | |
| 5,729,607 A | 3/1998 | DeFries et al. | |
| 5,744,526 A | 4/1998 | Goossens et al. | |
| 5,745,837 A | 4/1998 | Fuhrmann | |
| 5,822,678 A | 10/1998 | Evanyk | |

(Continued)

FOREIGN PATENT DOCUMENTS

EP 1 414 241 A1 4/2004

(Continued)

OTHER PUBLICATIONS

Echelon, Power Line Communications, May 1997.

(Continued)

*Primary Examiner*—Don N. Vo
(74) *Attorney, Agent, or Firm*—Pulse-LINK, Inc.; Peter R Martinez

(57) ABSTRACT

Methods and apparatus for creating, transmitting and receiving ultra-wideband pulses through wire media are presented. One embodiment of the present invention transmits ultra-wideband pulses that occupy radio frequencies that are not used by other electromagnetic signals present in a wire medium of interest. Other embodiments of the invention may create, transmit, and receive ultra-wideband pulses that use radio frequency(s) that are not used by other signals present on wire media within a wire network of interest. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

36 Claims, 12 Drawing Sheets

U.S. PATENT DOCUMENTS

| | | | |
|---|---|---|---|
| 5,828,946 | A | 10/1998 | Feisullin et al. |
| 5,864,284 | A | 1/1999 | Sanderson |
| 5,896,556 | A | 4/1999 | Moreland et al. |
| 5,937,342 | A | 8/1999 | Kline |
| 5,940,387 | A | 8/1999 | Humpleman |
| 5,944,842 | A | 8/1999 | Propp et al. |
| 5,982,276 | A | 11/1999 | Stewart |
| 6,031,862 | A | 2/2000 | Fullerton et al. |
| 6,040,759 | A | 3/2000 | Sanderson |
| 6,178,217 | B1 | 1/2001 | Defries et al. |
| 6,281,784 | B1 | 8/2001 | Redgate et al. |
| 6,373,377 | B1 | 4/2002 | Sacca et al. |
| 6,384,773 | B1 * | 5/2002 | Martin et al. ............... 342/202 |
| 6,549,567 | B1 | 4/2003 | Fullerton |
| 6,586,999 | B1 | 7/2003 | Richley |
| 6,721,298 | B1 | 4/2004 | Vella-Coleiro |
| 2001/0011930 | A1 | 8/2001 | Kintis et al. |
| 2001/0054953 | A1 | 12/2001 | Kline |
| 2002/0024423 | A1 | 2/2002 | Kline |
| 2002/0076193 | A1 | 6/2002 | Melick et al. |
| 2002/0097821 | A1 | 7/2002 | Hebron et al. |
| 2002/0116720 | A1 | 8/2002 | Terry et al. |
| 2003/0031191 | A1 | 2/2003 | El Wardani et al. |
| 2003/0202537 | A1 | 10/2003 | Rogerson et al. |
| 2004/0136438 | A1 * | 7/2004 | Fullerton et al. ........... 375/130 |
| 2004/0233972 | A1 * | 11/2004 | Karaoguz .................. 375/130 |
| 2004/0233973 | A1 * | 11/2004 | Fullerton et al. ........... 375/130 |

FOREIGN PATENT DOCUMENTS

WO    WO 02/31986    4/2002

OTHER PUBLICATIONS

Dan Raphaeli, Evgeni Bassin, A Comparison between OFDM, Single Carrier, and Spread Spectrum for high Data Rate PLC, Tel Aviv University, Israel, and Itran Communications, Apr. 1999.
Powerline Coexistence, White Paper, Mar. 2001.
Stephen Grossman, Existing In-Home Coax Can Support Data Comm, Electronic Design, Mar. 5, 2001, 3 pgs.
Automation Securities and Technology, homeautomation.net, 5 pgs.
Ken Davidson, CEBus Goes Coax, The Computer Applications Journal, Feb./Mar. 1992, 3 pgs, Issue 25.
Julie Jacobson, Coax Gaining Favor for In-Home Networks, Home Networking News, Jun. 2002, 5 pgs.
Business Wire, Entropic to Detail 270Mbps Home Networking Over COax at Communications Design Conference Wednesday, Mar. 31, Mar. 30, 2004, 2 pgs.
Entropic Communications, Core Technology Description, entropic-communications.com, 2 pgs.
Julie Jacobson, Coax Gets Consortium of Its Own, Home Networking News, May 2001, 2 pgs.
Noam Geri, Hybrid Coax-Wireless Multimedia Home Networks Using 802.11 Technology, Texas Instruments White Paper, Mar. 2003, 7 pgs.
COAXSYS, 10/100 Ethernet Products, coaxsys.com, 2 pgs.
PRNEWSWIRE, True Plug & Play Home Multimedia Network Debuts at NCTA, Silicon Strategies, May 4, 2004, 3 pgs.

* cited by examiner

ULTRA-WIDEBAND COMMUNICATION THROUGH A WIRE MEDIUM

This is a continuation-in-part of co-pending U.S. patent application Ser. No. 10/177,313, filed Jun. 21, 2002, entitled: ULTRA-WIDEBAND COMMUNICATION THROUGH A WIRED MEDIUM.

FIELD OF THE INVENTION

The present invention generally relates to UWB communications. More particularly, the invention concerns a method to transmit UWB signals over a wire medium.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as in-home movies-on-demand and video teleconferencing demand high data transmission rates. Another example is interactive video in homes and offices.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. These large data files, as well as the large data files that provide real-time home video are simply too large to be feasibly transmitted without an increase in system bandwidth. The need for more bandwidth is evidenced by user complaints of slow Internet access and dropped data links that are symptomatic of network overload.

Internet service providers, cable television networks and other data providers generally employ conductive wires and cables to transmit and receive data. Conventional approaches to signal (i.e. data) transmission through a transmission medium, such as a wire or cable, is to modulate the signal though the medium at a frequency that lies within the bounds at which the medium can electrically conduct the signal. Because of this conventional approach, the bandwidth of a specific medium is limited to a spectrum within which the medium is able to electrically transmit the signal via modulation, which yields a current flow. As a result, many costly and complicated schemes have been developed to increase the bandwidth in conventional conductive wire and/or cable systems using sophisticated switching schemes or signal time-sharing arrangements. Each of these methods is rendered costly and complex in part because the data transmission systems adhere to the conventional acceptance that the bandwidth of a wire or cable is constrained by its conductive properties.

Therefore, there exists a need for a method to increase the bandwidth of conventional wire networks.

SUMMARY OF THE INVENTION

The present invention provides methods and apparatus to transmit ultra-wideband pulses through wire media. One embodiment of the present invention transmits ultra-wideband pulses that occupy radio frequencies that are not used by other electromagnetic signals present in a wire medium of interest.

In another embodiment of the invention, a plurality of ultra-wideband pulses are created, transmitted, and received using radio frequency(s) that are not used by cable television signals. Other embodiments of the invention may create, transmit, and receive ultra-wideband pulses that use radio frequency(s) that are not used by signals present on wire media within any wire network of interest.

One feature of the present invention is that ultra-wideband pulses can be transmitted substantially simultaneously with a traditional cable television signal, Internet connection signal or voice transmission signal. Because the ultra-wideband signal can be transmitted substantially simultaneously with the other signals, the overall bandwidth or capability of the system to transmit data is vastly increased.

Figure 1:
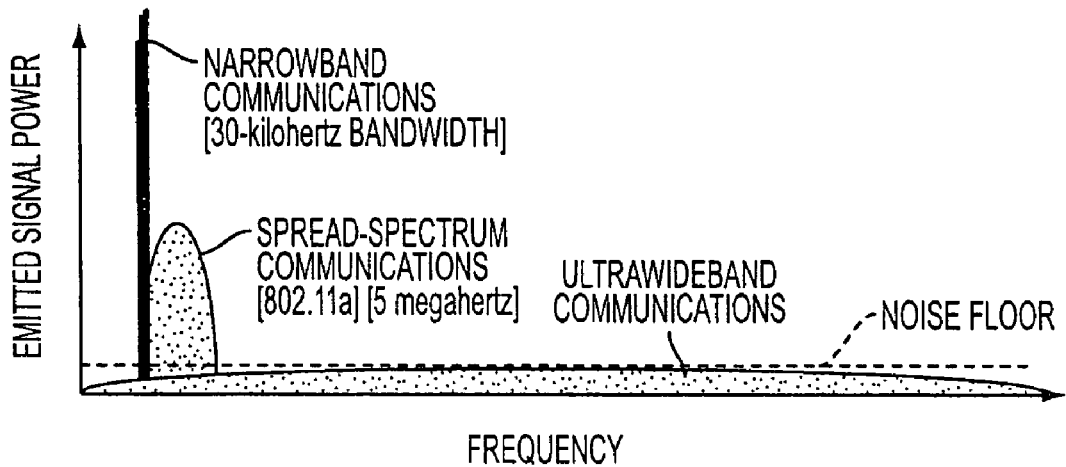
FIG. 1 is an illustration of different communication methods.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Generally, a traditional cable television provider, a community antenna television provider, a community access television provider, a cable television provider, a hybrid fiber-coax television provider, an Internet service provider, or any other provider of television, audio, voice and/or Internet data receives broadcast signals at a central station, either from terrestrial cables, and/or from one or more antennas that receive signals from a communications satellite. The broadcast signals are then distributed, usually by coaxial and/or fiber optic cable, from the central station to nodes located in business or residential areas.

For example, community access television provider (CATV) networks are currently deployed in several different topologies and configurations. The most common configurations found today are analog signals transmitted over coaxial cable and Hybrid Fiber-Coax Systems (HFCS) that employ both fiber optic and coaxial cables. The analog coax systems are typically characterized as pure analog systems. Pure analog CATV systems are characterized by their use of established NTSC/PAL (National Television Standards Committee/Phase Alternation Line) modulation onto a frequency carrier at 6 or 8 MHz intervals.

HFCS is a combination analog—digital topology employing both coaxial (analog) and fiber optic (digital) media that typically supports digitally modulated/encoded television channels above channel 78. According to ANSI/EIA-542-1997, in the United States, the analog channels are modulated in 6 MHz allocations on channels 2 to 78 using frequencies from 55 to 547 MHz. When using HFCS, digital channels typically start at channel 79 and go as high as 136 and occupy a frequency range from 553 to 865 MHz. In some extended HFCS systems, channel assignments can go as high as channel 158 or 997 MHz. The current ANSI/EIA-542-1997 standard only defines and assigns channels to these limits. The actual wire/cable media itself is generally capable of transmitting frequencies up to 3 GHz.

In both CATV and HFCS systems, typically the satellite downlink enters the cable company's head-end and the video, and/or other data streams are de-multiplexed out. Individual video data streams (either NTSC, MPEG, or any other suitable protocol) are extracted from the satellite downlink stream and routed to modulators specific for individual television channels. The outputs from each modulator are then combined into one broadband signal. From this point the combined channels are amplified and sent out, either by coaxial or fiber optic cable, to the customers.

In a HFCS, before the combined broadband signal leaves the head-end the broadband signal is modulated onto a fiber optic cable for distribution into the field, such as residential neighborhoods, or business districts. Modulation of the broadband signal is typically accomplished in one of two ways. In the first method the entire broadband signal is sampled and digitized using a high speed Analog to Digital Converter (ADC). To perform reliable digital sampling, the data must be sampled at a rate at least twice the highest frequency component to meet Nyquist minimum sampling requirements. To provide a higher quality data stream, the signal should be sampled at 2.5 to 4 times the highest frequency, which entails sample rates of approximately 2 to 4 GHz. A parallel to serial converter then shifts the parallel output data of the ADC into a serial format. The serial data then drives a laser diode for transmission over the fiber optic cable. The second method is broadband block conversion where the entire spectrum of the broadband signal is modulated onto the fiber optic cable.

Designated access nodes are located in neighborhoods, business districts and other areas. The access nodes contain a high speed Digital to Analog Converter (DAC) and a de-serializer. A fiber optic receiver detects the laser-modulated signal at the access node. A parallel to serial converter de-serializes the data and it is feed to the high speed DAC. The data then leaves the access node on standard 75 ohm, RG-6 or RG-8 or other suitable coax cable and is distributed to the customer's premises. Thus, at the access node, the broadband signal is extracted from the fiber optic cable and transferred to a coaxial cable that connects to individual homes, apartments, businesses, universities, and other customers. Support of multiple customers is generally accomplished by the use of distribution boxes in the field, for example, on telephone poles or at ground level. However, as the signal is continuously split at the distribution boxes, the received bandwidth is reduced and the quality of the signal is diminished, thereby diminishing the video, audio, and other data quality.

The digital channels that generally reside on CATV channels 79 and higher are fundamentally different than the analog channels that generally reside on channels 2 through 78. The analog channels are composed of modulated frequency carriers. The digital channels, which generally use the 6 MHz allocation system, are digitally modulated using Quadrature Amplitude Modulation (QAM). QAM is a method of combining two amplitude-modulated signals into a single channel, thereby doubling the effective bandwidth. In a QAM signal, there are two carriers, each having the same frequency but differing in phase by 90 degrees. The two modulated carriers are combined for transmission, and separated after transmission. QAM 16 transmits 16 bits per signal, QAM 32, 64, and 256 each transmit 32, 54 and 256 bits per signal, respectively. QAM was developed to support additional video streams encoded with MPEG video compression. Conventional CATV and HFCS networks may employ QAM levels up to QAM 64 to enable up to 8 independent, substantially simultaneous MPEG video streams to be transmitted.

At the customer's location, the coaxial cable is connected to either a set-top box or directly to a television. The receiving device then de-multiplexes and de-modulates the video, audio, voice, Internet or other data. Although a television can directly receive the analog signal, a set-top box is generally required for reception of the digitally encoded channels residing on CATV channels 79 and higher.

The above-described networks, and other networks and communication systems that employ wired media, such as twisted-pair or coaxial cable, suffer from performance limitations caused by signal interference, ambient noise, and spurious noise. In these conventional wired media systems, these limitations affect the available system bandwidth, distance, and carrying capacity of the system, because the noise floor and signal interference in the wired media rapidly overcome the signal transmitted. Therefore, noise within the wired media significantly limits the available bandwidth of any wired system or network.

Generally, the conventional wisdom for overcoming this limitation is to boost the power (i.e., increase the voltage of the signal) at the transmitter to boost the voltage level of the signal relative to the noise at the receiver. Without boosting the power at the transmitter, the receiver is unable to separate the noise from the desired signal. Thus, the overall performance of wired media systems is still significantly limited by the accompanying noise that is inherent in wired media.

Increasing the available bandwidth of an established wired media network, while coexisting with the conventional data signals transmitted through the network, represents an opportunity to leverage the existing wired media network infrastructure to enable the delivery of greater functionality. Several methods and techniques have been proposed, but they are generally computationally intense, hence costly.

The present invention may be employed in any type of network that uses wired media, in whole, or in part. That is, a network may use both wired media, such as coaxial cable, and wireless devices, such as satellites. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a metropolitan area network (MAN), and a wide area network (WAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, and shielded twisted pair, among others.

The present invention employs a substantially "carrier free" architecture which does not require the use of noise waveform detectors, stabilizers, or other devices employed in conventional frequency domain communication systems. The present invention dramatically increases the bandwidth of conventional networks that employ wired media, but can be inexpensively deployed without extensive modification to the existing wired media network.

The present invention provides increased bandwidth by injecting, or otherwise super-imposing an ultra-wideband (UWB) signal into the existing data signal and subsequently recovers the UWB signal at an end node, set-top box, subscriber gateway, or other suitable location. Ultra-wideband, or impulse radio, employs pulses of electromagnetic energy that are emitted at nanosecond or picosecond intervals (generally tens of picoseconds to a few nanoseconds in duration). For this reason, ultra-wideband is often called "impulse radio." Because the excitation pulse is not a modulated waveform, UWB has also been termed "carrier-free" in that no apparent carrier frequency is evident in the radio frequency (RF) spectrum. That is, the UWB pulses are transmitted without modulation onto a sine wave carrier frequency, in contrast with conventional radio frequency technology. Ultra-wideband requires neither an assigned frequency nor a power amplifier.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Another example of a conventional radio frequency technology is illustrated in FIG. 1. 802.11a, a wireless local area network (LAN) protocol, transmits radio frequency signals at a 5 GHz center frequency, with a radio frequency spread of about 5 MHz.

Figure 2:
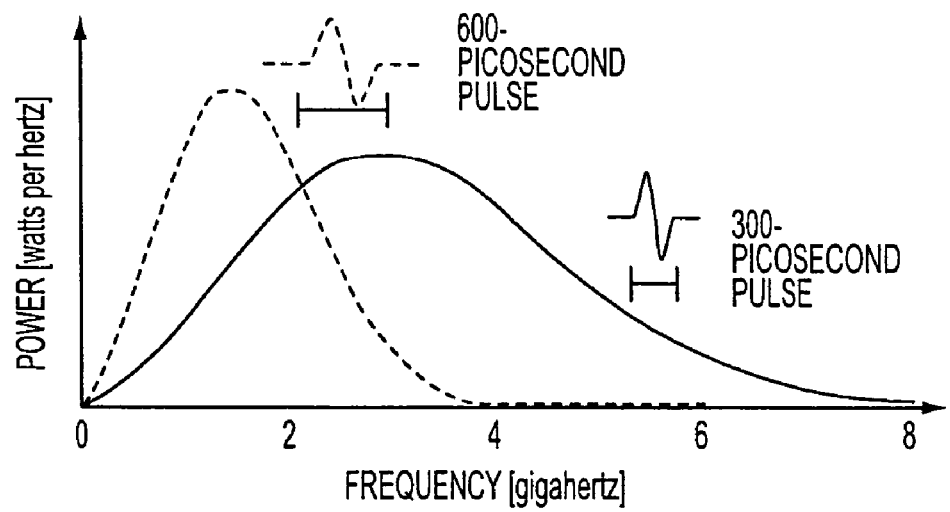
FIG. 2 is an illustration of two ultra-wideband pulses.

In contrast, a UWB pulse may have a 1.8 GHz center frequency, with a frequency spread of approximately 4 GHz, as shown in FIG. 2, which illustrates two typical UWB pulses. FIG. 2 illustrates that the narrower the UWB pulse in time, the higher its center frequency and the broader the spread of its frequency spectrum. This is because frequency is inversely proportional to the time duration of the pulse. A 600 picosecond UWB pulse will have about a 1.8 GHz center frequency, with a frequency spread of approximately 4 GHz. And a 300 picosecond UWB pulse will have about a 3 GHz center frequency, with a frequency spread of approximately 8 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt signal of one nano-second duration spreads the one-watt over the entire frequency occupied by the pulse. At any single frequency, such as at the carrier frequency of a CATV provider, the UWB pulse power present is one nano-watt (for a frequency band of 1 GHz). This is well within the noise floor of any wired media system and therefore does not interfere with the demodulation and recovery of the original CATV signals. Generally, the multiplicity of UWB pulses are transmitted at relatively low power (when sampled at a single, or specific frequency), for example, at less than −30 power decibels to −60 power decibels, which minimizes interference with conventional radio frequencies. However, UWB pulses transmitted through most wired media will not interfere with wireless radio frequency transmissions. Therefore, the power (sampled at a single frequency) of UWB pulses transmitted though wired media may range from about +30 dB to about −90 dB.

For example, a CATV system generally employs a coaxial cable that transmits analog data on a frequency carrier. Generally, amplitude modulation (AM) or QAM (discussed above) are used to transmit the analog data. Since data transmission employs either AM or QAM, UWB signals can coexist in this environment without interference. In AM, the data signal M(t) is multiplied with a cosine at the carrier frequency. The resultant signal y(t) can be represented by:

$$y(t) = m(t)\cos(\omega_c t)$$

In a QAM based system multiple carrier signals are transmitted at the same carrier frequency, but at different phases. This allows multiple data signals to be simultaneously carried. In the case of two carriers, an "in phase" and "quadrature" carriers can carry data signals Mc(t) and Ms(t). The resultant signal y(t) can be represented as:

$$y(t) = Mc(t)\cos(\omega_c t) + Ms(t)\sin(\omega_c t)$$

However, as discussed above, an UWB system transmits a narrow time domain pulse, and the signal power is generally evenly spread over the entire bandwidth occupied by the signal. At any instantaneous frequency, such as at the AM or QAM carrier frequency, the UWB pulse power present is one nano-watt (for a frequency band of 1 GHz). This is well within the noise floor of any wired media system and therefore does not interfere with the demodulation and recovery of the original AM or QAM data signals.

Wired media communication systems suffer from performance limitations caused by signal interference, ambient noise, and spurious noise. These limitations affect the available bandwidth, distance, and carrying capacity of the wire media system. With wired communication systems, the noise floor and signal interference in the wired media rapidly overcome the transmitted carrier signal. This noise on the wired media is a significant limitation to the ability of the system to increase bandwidth. UWB technology makes use of the noise floor to transmit data, without interfering with the carrier signal. Moreover, UWB transmitted through a wired medium has distinct advantages over its use in a wireless environment. In a wired environment there are no concerns with intersymbol interference, and there are no concerns relating to multi-user interference.

For example, CATV channels typically occupy 6 MHz in the US and 8 MHz in Europe. These channels are arranged in a re-occurring pattern beginning at approximately 50 MHz and dependent on the CATV system, extend upward to 550 MHz, 750 MHz, 870 MHz, 1 GHz and higher. The present invention is capable of injecting UWB pulses into the existing CATV infrastructure. These UWB signals do not interfere or degrade existing frequency domain signals. Additionally, the UWB signals can carry vast amounts of information with digital meaning in the time domain.

Figure 3:
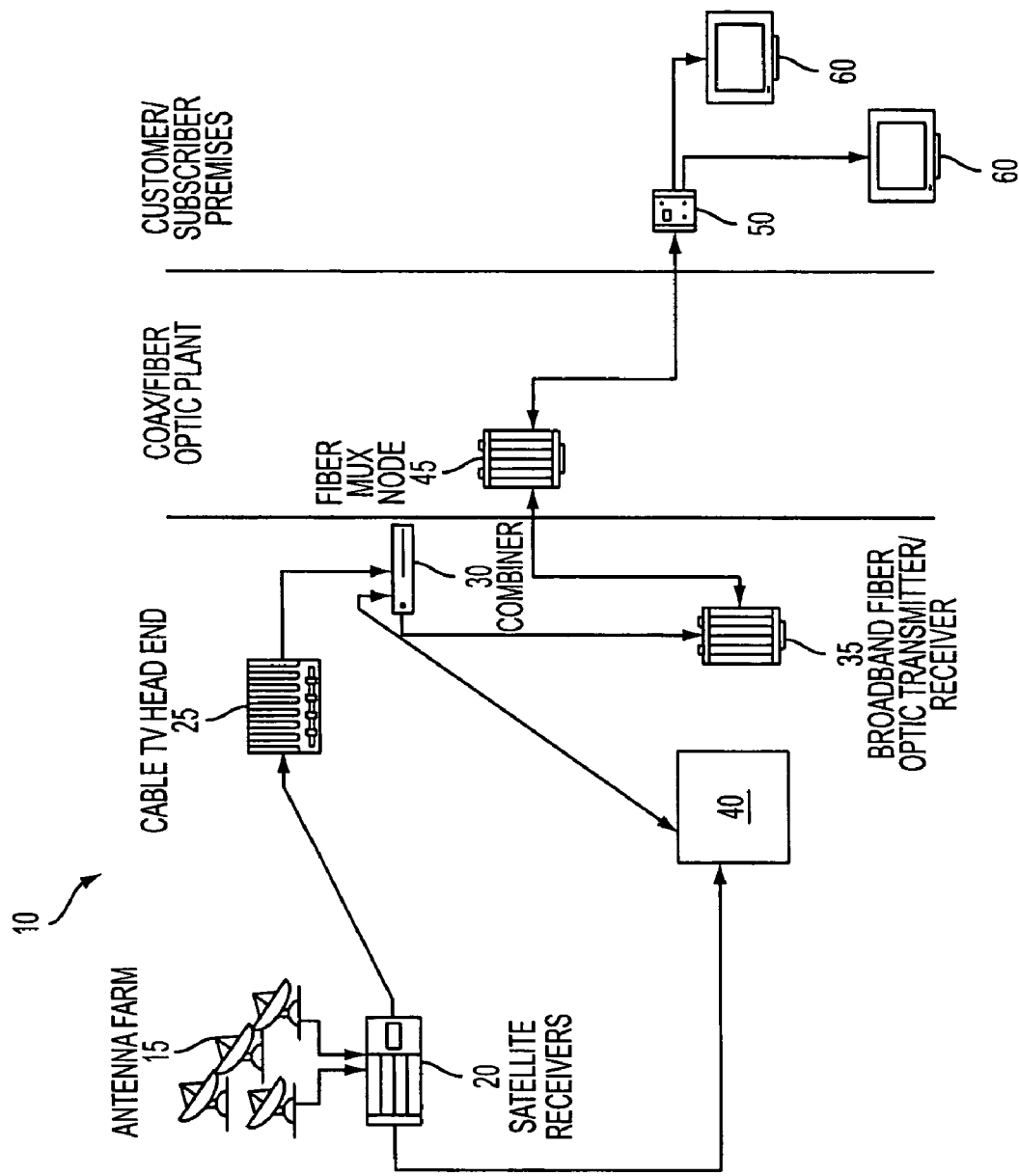
FIG. 3 is a schematic illustration of one embodiment of an ultra-wideband communication system employing a wired medium.
Figure 4:
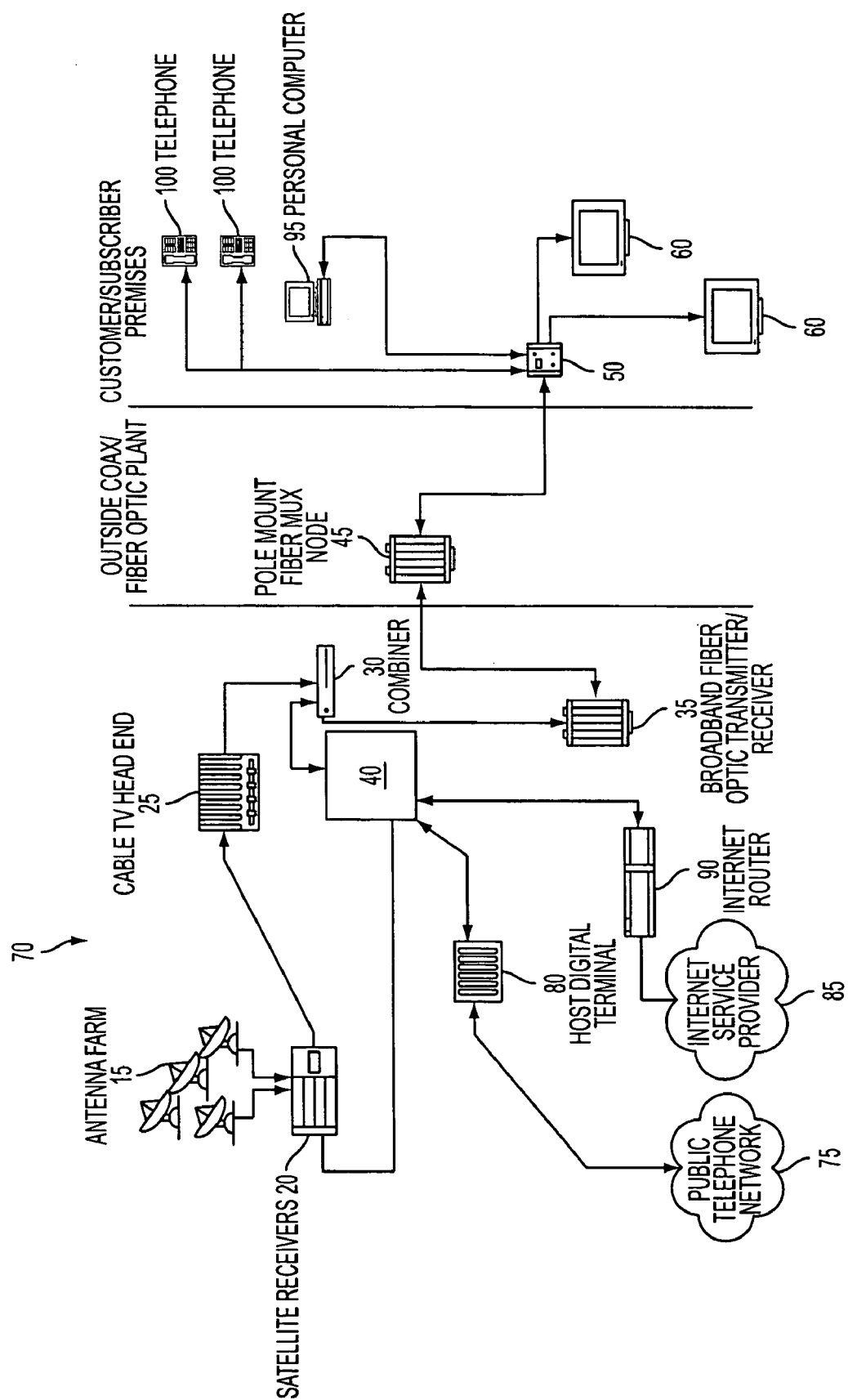
FIG. 4 is a schematic illustration of a second embodiment of an ultra-wideband communication system employing a wired medium.

The present invention provides an apparatus and method to enable any wired media network to augment their available bandwidth. Preferably, this additional bandwidth is obtained by introducing UWB signals into the existing data transmission chain prior to broadcast from the system operator's head-end. As shown in FIGS. 3 and 4, the head-end may include several components, such as the antenna farm 15, the satellite receivers 20, the channel modulator 25, the combiner 30, and the fiber optic transmitter/receiver 35. Alternatively, UWB signals may be introduced into the wired media network at other locations, such as at the Internet router 90 or at the host digital terminal 80, or at any other suitable location.

In like fashion, cable system operators can receive more data from individual subscribers by introducing subscriber-generated data into existing upstream channels. The present invention provides UWB communication across fiber optic and coaxial cable, twisted pair wires, or any other type of conductive wire. A wired media network will be able to both transmit and receive digital information for the purposes of telephony, high-speed data, video distribution, video conferencing, wireless base operations and other similar purposes.

Referring to FIG. 3, the wired ultra-wideband communication system 10 is configured to transmit ultra-wideband signals over an existing network or system that includes wired media. For example, the wired ultra-wideband (UWB) system 10 may transmit UWB signals over an existing community access television network (CATV), an optical network, a cable television network, a community antenna television network, a hybrid fiber-coax television network, an Internet service provider network, a PSTN network, a WAN, LAN, MAN, TCP/IP network, a college campus, town, city, or any other type of network as defined above, that employs wired media, in whole or in part.

One embodiment of the wired UWB communication system 10 is illustrated in FIG. 3. An antenna farm 15 receives audio, video and data information from one or more satellites (not shown). Additional data may be received by terrestrial cables and wires, and by terrestrial wireless sources, such as a multichannel multipoint distribution service (MMDS). The data is then forwarded to the satellite receivers 20 that demodulate the data into separate audio, video and data streams. This information is forwarded to the channel modulators 25 that receive the program signals, such as CNN or MTV. The channel modulators 25 mix each signal with a radio frequency (RF) and assign a station number (such as 2 to 99) that each program will be received on by subscribers.

The multiple RF signals are then forwarded to a combiner 30 that combines the multiple signals into a single output. That is, the combiner 30 receives the program signals from the channel modulators 25 and combines them onto a single coax cable and forwards the signal to the fiber optic transmitter/receiver 35. The above-described arrangement and function of channel modulators 25 and combiners 30 may vary with each type of wired media network.

Additional audio, video, or other data signals received from either the antenna farm 15 or from terrestrial sources such as fiber optic or coaxial cables can be routed from the satellite receiver 20 to the service provider ultra-wideband (UWB) device 40. The service provider UWB device 40 converts the audio, video, or other data signals received from the satellite receiver 20 into a multiplicity of UWB electromagnetic pulses. The service provider ultra-wideband (UWB) device 40 may include several components, including a controller, digital signal processor, an analog coder/decoder, one or more devices for data access management, and associated cabling and electronics. The service provider ultra-wideband (UWB) device 40 may include some, or all of these components, other necessary components, or their equivalents. The controller may include error control, and data compression functions. The analog coder/decoder may include an analog to digital conversion function and vice versa. The data access management device or devices may include various interface functions for interfacing to wired media such as phone lines and coaxial cables.

The digital signal processor in the service provider ultra-wideband (UWB) device 40 modulates the audio, video, or other data signals received from the satellite receiver 20 into a multiplicity of UWB electromagnetic pulses, and may also demodulate UWB pulses received from the subscriber. As defined herein, modulation is the specific technique used to encode the audio, video, or other data into a multiplicity of UWB pulses. For example, the digital signal processor may modulate the received audio, video, or other data signals into a multiplicity of UWB pulses that may have a duration that may range between about 0.1 nanoseconds to about 100 nanoseconds, and may be transmitted at relatively low power, for example, at less than −30 power decibels to −60 power decibels, as measured across the transmitted frequency.

The UWB pulse duration and transmitted power may vary, depending on several factors. Different modulation techniques employ different UWB pulse timing, durations and power levels. The present invention envisions several different techniques and methods to transmit an UWB signal across a wired medium. One embodiment, may for example, use pulse position modulation that varies the timing of the transmission of the UWB pulses. One example of a pulse position modulation system may transmit approximately 10,000 pulses per second. This system may transmit groups of pulses 100 picoseconds early or 100 picoseconds late to signify a specific digital bit, such as a "0" or a "1". In this fashion a large amount of data may be transmitted across a wired medium. Alternatively, the UWB signal may be transmitted in a fashion similar to that described in U.S. Patent Application entitled, "ENCODING AND DECODING ULTRA-WIDEBAND INFORMATION," Ser. No. 09/802,590 (in the name of John H. Santhoff and Rodolfo T. Arrieta), which is referred to and incorporated herein in its entirety by this reference.

An alternative modulation technique may use pulse amplitude modulation to transmit the UWB signal across a wired medium. Pulse amplitude modulation employs pulses of different amplitude to transmit data. Pulses of different amplitude may be assigned different digital representations of "0" or "1." Other envisioned modulation techniques include On-Off Keying that encodes data bits as pulse (1) or no pulse (0), and Binary Phase-Shift Keying (BPSK), or bi-phase modulation. BPSK modulates the phase of the signal (0 degrees or 180 degrees), instead of modulating the position. Spectral Keying, which is neither a PPM nor PAM modulation technique may also be employed. It will be appreciated that other modulation techniques, currently existing or yet to be conceived, may also be employed.

A preferred modulation technique will optimize signal coexistence and pulse reliability by controlling transmission power, pulse envelope shape and Pulse Recurrent Frequencies (PRF). Both pseudo-random and fixed PRFs may be used, with the knowledge that a fixed PRF may create a "carrier-like frequency," which it and its higher order harmonics may interfere with the data carried in conventional RF carrier channels. However, with a pseudo-random PRF the difficulties encountered with a fixed PRF are usually avoided. One embodiment of a pseudo-random PRF modulation technique may include a UWB pulse envelope that is shaped to pre-amplify and compensate for high frequency components that the wired media may naturally attenuate. UWB pulse envelope shaping has the additional advantage of controlling the power spectral density of the transmitted data stream.

Several advantages exist when transmitting UWB pulses through wired media as opposed to transmitting UWB pulses through a wireless medium. Wireless UWB transmissions must consider such issues as Inter-Symbol Interference (ISI) and Multi-User Interference (MUI), both of which can severely limit the bandwidth of UWB transmissions. Some modulation techniques such as Pulse Amplitude Modulation (PAM), which offer the ability for high bit densities are not effective at long wireless distances. These, and other issues, do not apply to UWB pulses transmitted over wired media. In addition, no multipath issues arise and there are no propagation delay problems present in a wired medium. Therefore, it is estimated that an ultra-wideband system may be able to transmit data across a wired medium in a range from 100 Mbit/second to 1 Gbit/second. This data rate will ensure that the bandwidth requirements of any service provider can be met.

A preferred embodiment of the service-provider UWB device 40 will spread the signal energy of the UWB data stream across the a bandwidth that may ranger from 50 MHz to approximately 870 MHz or as discussed above, to 1 GHz, or higher. This will ensure that the signal energy present at any frequency is significantly below the normal noise floor for that frequency band, further ensuring coexistence with conventional RF carrier data.

For example, a UWB pulse would have a duration of about 1 nano-second in a UWB data stream that has a 1 GHz bandwidth. Alternatively, the UWB pulse duration would be tailored to match the available frequency of the specific network. For a CATV or HFCS network located in the United States, an ideal UWB pulse would generally be about 0.5 to 2 nano-seconds in duration. This is because a conventional CATV or HFCS network located in the United States typically utilizes a maximum frequency of approximately 870 MHz, but has the capacity to utilize up to 1 GHz. This bandwidth allows for a 1 to 2 nano-second pulse duration. A narrow pulse width is preferred because more pulses can be transmitted in a discrete amount of time. Pulse widths of up to 2 nano-seconds may be employed to guarantee pulse integrity throughout digitization, transmission, reception and reformation at the UWB subscriber device 50. Generally, an idealized pulse width would be calculated based on the frequency response of the specific wired media system.

Referring to FIG. 3, the multiplicity of generated UWB pulses are sent from the service-provider UWB device 40 to the combiner 30, which combines the UWB pulses with the conventional RF carrier signals. One method to accomplish this task is to couple a wire carrying the conventional RF carrier signals to a standard coaxial splitter. A second wire carrying the UWB pulses is also coupled to the standard coaxial splitter. The combined signals are forwarded to the fiber optic transmitter/receiver 35. The fiber optic transmitter/receiver 35 converts both the multiplicity of UWB pulses and the conventional RF carrier signals received from the combiner 30 into a corresponding optical signal. The optical signal generator can be either a light-emitting diode, solid state laser diode, or other suitable device. The optical signal is then distributed on fiber optic cables to residential neighborhoods, business districts, universities, colleges or other locations for distribution to subscribers and customers. Other methods and techniques for combining a UWB pulse stream and a conventional RF carrier signal stream may also be employed. For example, the UWB pulse stream my be sent directly to the fiber optic transmitter/receiver 35, which will then combine the two signals.

Shown in FIG. 3, a fiber multiplexer node 45 may be located at any one of the locations described above. The optical signals are received by the multiplexer 45 and are converted back to the combined conventional RF carrier and UWB pulsed signals. The combined signals are forwarded to a subscriber UWB device 50. The subscriber UWB device 50 can be considered a gateway or router that provides access to the combined signals.

One embodiment of the subscriber UWB device 50 will demodulate the multiplicity of UWB electromagnetic pulses back into a conventional RF carrier signal. The subscriber UWB device 50 may include all, some or additional components found in the service provider UWB device 40. In this manner, additional bandwidth will be available to the wired media network to provide the additional data and functionality demanded by the customer.

An alternative embodiment of the present invention is illustrated in FIG. 4. A full service wired UWB communication system 70 is structured to allow for extremely high data rate transmission of video, telephone, internet and audio signals.

The full service UWB system 70 receives audio, video and data information from an antenna farm 15 or from terrestrial sources such as fiber optic or coaxial cables. These signals are forwarded to the satellite receivers 20 as described above with reference to the wired UWB communication system 10. In addition, signals from a public telephone network 75 are received by a host digital terminal 80. The host digital terminal 80 modulates multiple voice signals into two-way upstream and downstream RF signals. The voice signals from the host digital terminal 80 are forwarded to the service provider UWB device 40.

An internet service provider 85 forwards internet data to the internet router 90. The internet router 90 generates packets, such as TCP/IP packets, which are forwarded to the service provider UWB device 40.

The service provider UWB device 40 modulates the internet data, the telephony data and the data received from the satellite receivers 20 into a multiplicity of electromagnetic pulses, as described above, and forwards the pulses to the combiner 30. The combiner combines the UWB pulses with the conventional RF carrier signals and forwards the combined signal to the fiber optic transmitter/receiver 35. The signals are then converted into an optical signal by either a light emitting diode, solid state laser diode, or other suitable device. The optical signal is then distributed to the fiber multiplexer node 45 located within business districts, residential neighborhoods, universities, colleges and other areas.

The fiber multiplexer node 45 receives the fiber optic signal and converts them back to the combined conventional RF carrier and UWB pulsed signals. The combined signals are forwarded to a subscriber UWB device 50. The subscriber UWB device 50 can be considered a gateway or router that provides access to the combined signals. The subscriber UWB device 50 demodulates the multiplicity of UWB electromagnetic pulses into RF signals and forwards the RF signals to appropriate locations such as televisions, personal computers or telephones. Alternative embodiment subscriber UWB devices 50 may be located adjacent to televisions sets similar to a set-top box and used to transmit on-demand movies, internet access or pay-per-view programs. Yet another embodiment of the present invention may include a UWB device 50 that may be located within a television set, or computer. The UWB device 50 is constructed to convert and distribute data to computers, network servers, digital or subscription televisions, interactive media devices such as set-top boxes and telephone switching equipment.

The subscriber UWB device 50 may also be configured to transmit UWB pulses wirelessly to provide audio, video, and other data content to personal computers, televisions, PDAs, telephones and other devices. For example, UWB device 50 may include the necessary components to transmit and receive UWB or conventional RF carrier signals to provide access to interfaces such as PCI, PCMCIA, USB, Ethernet, IEEE1394, or other interface standards.

The present invention will also allow for data to be transmitted "upstream" toward the service provider. For example, a conventional CATV or HFCS network reserves frequencies below 50 MHz for upstream traffic. One embodiment of the present invention may include a band-pass filter with stop-bands above 1 GHz, and below 50 MHz to ensure attenuation of UWB pulses so as not to interfere with upstream traffic. These filters also serve the purpose of limiting potential inter-modulation distortion that could be introduced by the UWB pulses.

Alternative embodiments of the present invention may transmits UWB pulses through traditional telephone wires. Depending upon the provider, whether they be a local or long distance carrier, an UWB transmitter/receiver can be located in a regional center, sectional center, primary center, toll center, end-office, or their equivalents.

The present invention of transmitting ultra-wideband signals across a wired medium can employ any type of wired media. For example, the wired media can include optical fiber ribbon, fiber optic cable, single mode fiber optic cable, multi-mode fiber optic cable, plenum wire, PVC wire, and coaxial cable.

In addition, the wired media can include twisted-pair wiring, whether shielded or unshielded. Twisted-pair wire may consist of "pairs" of color-coded wires. Common sizes of twisted-pair wire are 2 pair, 3 pair, 4 pair, 25 pair, 50 pair and 100 pair. Twisted-pair wire is commonly used for telephone and computer networks. It comes in ratings ranging from category 1 to category 7. Twisted-pair wiring also is available unshielded. That is, the wiring does not have a foil or other type of wrapping around the group of conductors within the jacket. This type of wiring is most commonly used for wiring for voice and data networks. The foregoing list of wired media is meant to be exemplary, and not exclusive.

As described above, the present invention can provide additional bandwidth to enable the transmission of large amounts of data over an existing wired media network, whether the wired media network is a Internet service provider, cable television provider, or a computer network located in a business or university. The additional bandwidth can allow consumers to receive the high speed Internet access, interactive video and other features that they are demanding.

Additional embodiments of the present invention, having added features and functionality will now be described in connection with FIGS. 5–13.

Figure 5:
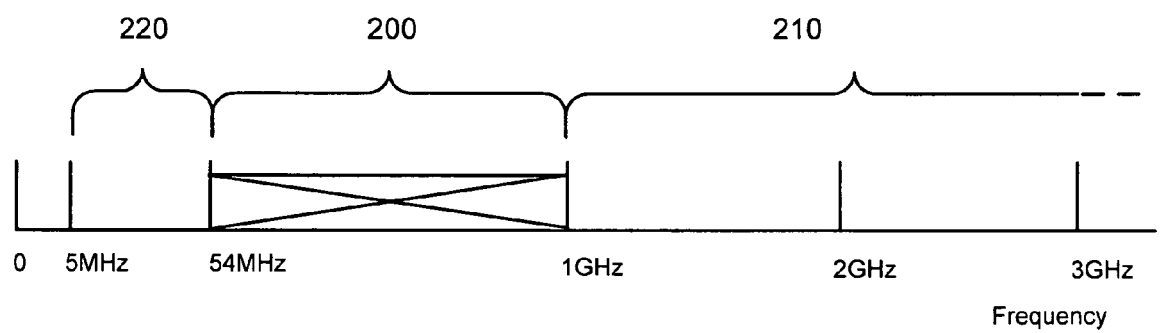
FIG. 5 is an illustration of a portion of the radio frequency spectrum.

Referring now to FIG. 5, which illustrates different radio frequency bands occupying a portion of the radio frequency spectrum. As discussed above, North American community access television (CATV) networks provide content using carrier wave communication technology over analog and digital channels starting at channel 2 and running as high as channel 158, and occupying radio frequency spectrum ranging from about 54 MHz to about 997 MHz (used spectrum 200). However, different CATV networks may occupy different amounts of radio frequency spectrum, with older systems using frequencies ranging from about 54 MHz to about 450 MHz. As shown in FIGS. 3 and 4, and discussed above, a coaxial cable is routed from the fiber multiplexer node 45 to the home, apartment complex, hospital, etc. Once inside the home, business, hospital, apartment complex or other group of buildings, the coaxial cable is used to deliver the content to televisions, personal computers, monitors, or other devices. This coaxial cable is generally capable of transmitting radio frequency signals having frequencies up to about 10 GHz. Therefore, as shown in FIG. 5, un-used spectrum 210, ranging from about 1 GHz to about 3 GHz, is vacant. In addition, the lightly-used spectrum 220 between about 5 MHz to about 54 MHz is generally sparsely occupied by frequency channels dedicated to "upstream" communications (i.e., between the customer and the CATV provider).

The present invention provides methods and apparatus to transmit ultra-wideband (UWB) pulses that occupy radio frequencies that are not used by other electromagnetic signals present in a wire medium of interest. In the CATV example described above, UWB pulses may be transmitted in the un-used spectrum 210 or in the lightly-used spectrum 220.

It will be appreciated that the specific radio frequencies employed by the present invention will vary, depending upon the type of network. Generally, different networks use different radio frequencies, thus leaving different frequencies vacant, or un-used. The present invention may use any un-used, or lightly-used radio frequencies in a network. As shown in FIGS. 3 and 4, and discussed above, in a CATV network, coaxial cable is routed from the fiber multiplexer node 45 to a subscriber UWB device 50 that may located in the home, apartment complex, hospital, etc. Once inside the home, business, hospital, apartment complex or other group of buildings, the coaxial cable is used to deliver video, voice, data, Internet content, or other content to televisions, personal computers, monitors, or other devices. The present invention of using un-used frequencies or lightly-used frequencies to transmit and receive ultra-wideband signals may be employed at either the fiber multiplexer node 45 or the subscriber UWB device 50. In a preferred embodiment the subscriber UWB device 50 creates, transmits, and receives ultra-wideband pulses that use radio frequency(s) that are not used by other signals present on wire media within any wire network of interest.

By employing un-used radio frequencies to carry additional content, such as video, voice, data, Internet content, or other types of content, the present invention can increase the bandwidth of a network.

Figure 6:
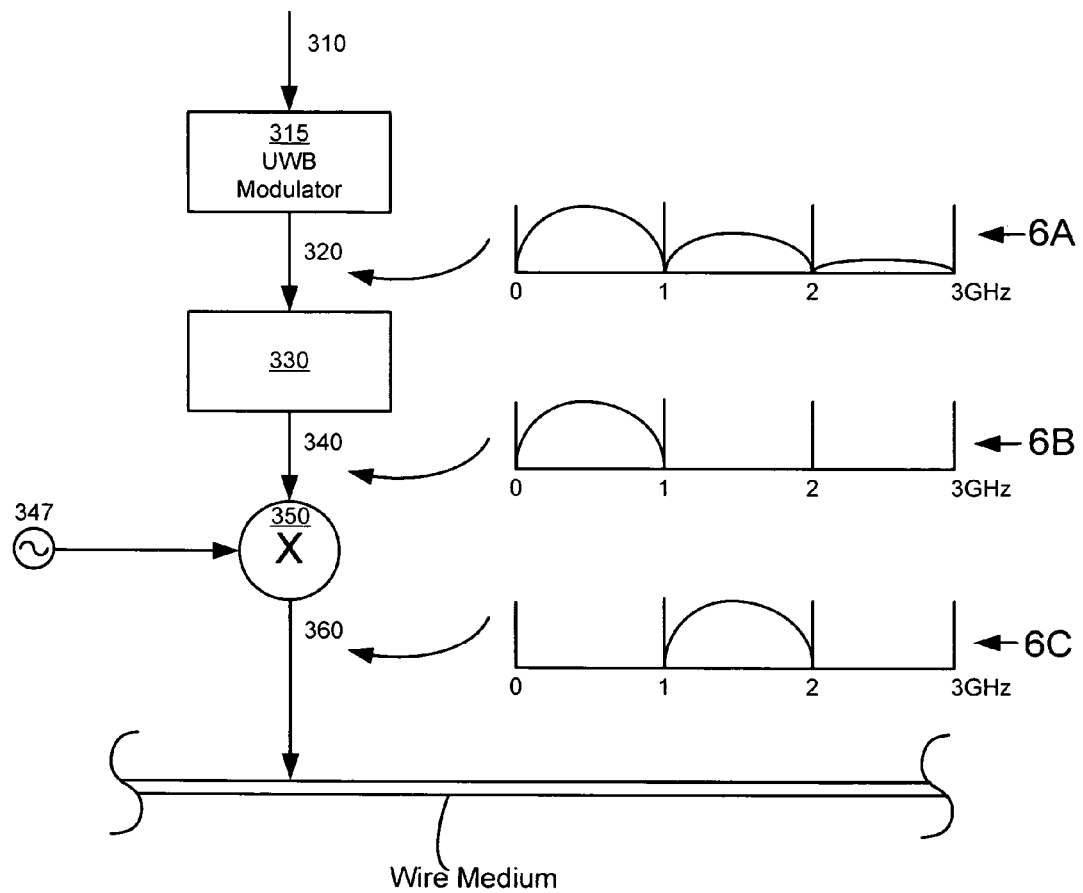
FIG. 6 illustrates a first method of the invention that introduces ultra-wideband pulses into a wire medium.

Referring now to FIG. 6, one method of transmitting ultra-wideband pulses in a CATV network is illustrated. Binary digits, or bits 310 are modulated into ultra-wideband (UWB) pulses occupying the unused spectrum 210 and injected into the wire medium (in this case a coaxial cable) that is carrying CATV content. In this embodiment, the bits 310 are modulated by UWB modulator 315 into UWB pulses 320 occupying the bandwidth of 0 Hz to about 1 GHz, with harmonic copies residing in higher frequency ranges, as shown in FIG. 6A. As discussed above, a number of different modulation methods may be employed by the present invention. One modulation method may be "coded recurrence" modulation, that is described in co-pending Unites States patent applications: Ser. No. 10/294,021, filed Nov. 12, 2002; Ser. No. 10/747,606, filed Dec. 29, 2003; and Ser. No. 10/747,608, filed Dec. 29, 2003, all entitled "Ultra-wideband Pulse Modulation System and Method," and all of which are referred to and incorporated herein in their entirety by this reference.

As shown in FIG. 6, the UWB pulses 320 are passed through a low-pass filter 330 that passes radio frequencies below 1 gigahertz (GHz), thereby removing the harmonic copies, as shown in FIG. 6B. The filtered UWB pulses 340 are mixed by mixer 350 with a sinusoid of frequency $\omega_c$=1 GHz. This produces upward-shifted UWB pulses 360, that occupy the radio frequencies between 1 GHz to 2 GHz, as shown in FIG. 6C. The upward-shifted UWB pulses 360 are then injected into the wire medium of interest, such as CATV network, causing no interference with the CATV channel content that occupies used spectrum 200. It will be appreciated that the radio frequency spectrum occupied by the upward-shifted UWB pulses 360 may be greater than or less than the 1 GHz discussed above. For example, the upward-shifted UWB pulses 360 may occupy any desired portion of the radio frequency spectrum ranging from 1 GHz to 10 GHz. In addition, because the upward-shifted UWB pulses 360 are transmitted at radio frequencies that are not used by the network, the power used to transmit the upward-shifted UWB pulses 360 may be greater than the power used to transmit UWB pulses that share the same radio frequencies used by other signals in the network.

Alternatively, the UWB pulses may be generated directly at the desired frequency. By using an arbitrary waveform generator with a sufficiently high frequency capability, UWB pulses can be generated to have any frequency content up to the Nyquist frequency of the waveform generator. This embodiment eliminates the need for the filter 330 and mixer 350 illustrated in FIG. 6.

Figure 7:
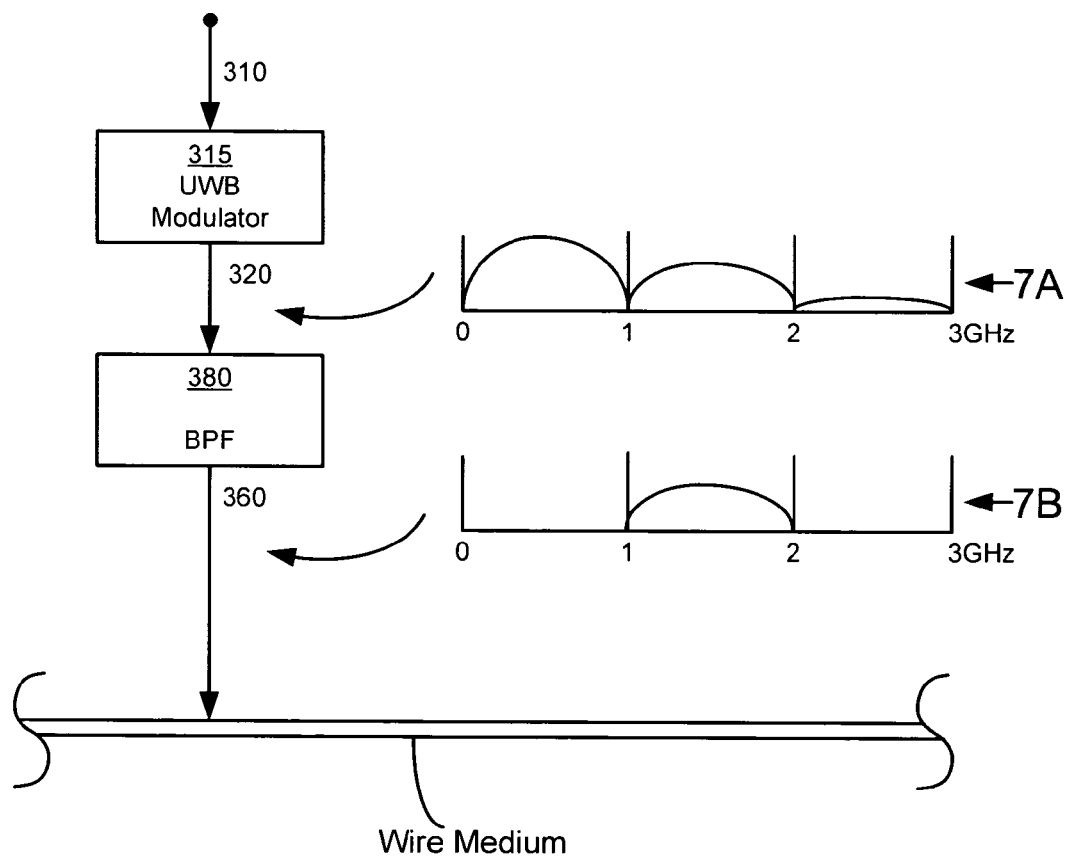
FIG. 7 illustrates a second method of the invention that introduces ultra-wideband pulses into a wire medium.

Referring now to FIG. 7, another method of transmitting ultra-wideband pulses in a CATV network is illustrated. Bits 310 are modulated by UWB modulator 315 into UWB pulses 320 occupying radio frequency spectrum from about 0 Hz to about 1 GHz, with harmonic copies residing in higher frequency ranges, as shown in FIG. 7A. The UWB pulses 320 are passed through a bandpass filter (BPF) 380 structured to pass frequencies above 1 GHz and below 2 GHz, thereby removing the "baseband" UWB waveform and its harmonic copies above 2 GHz, as shown in FIG. 7B. The upward shifted UWB pulses 360 now occupy the frequency spectrum between about 1 and about 2 GHz, which comprises a portion of the unused spectrum 210. As discussed above, the upward-shifted UWB pulses 360 may occupy any desired portion of the radio frequency spectrum ranging from 1 GHz to 10 GHz. The upward shifted UWB pulses 360 are then injected into the wire medium, causing no interference with the CATV channel content that occupies used spectrum 200.

Figure 8:
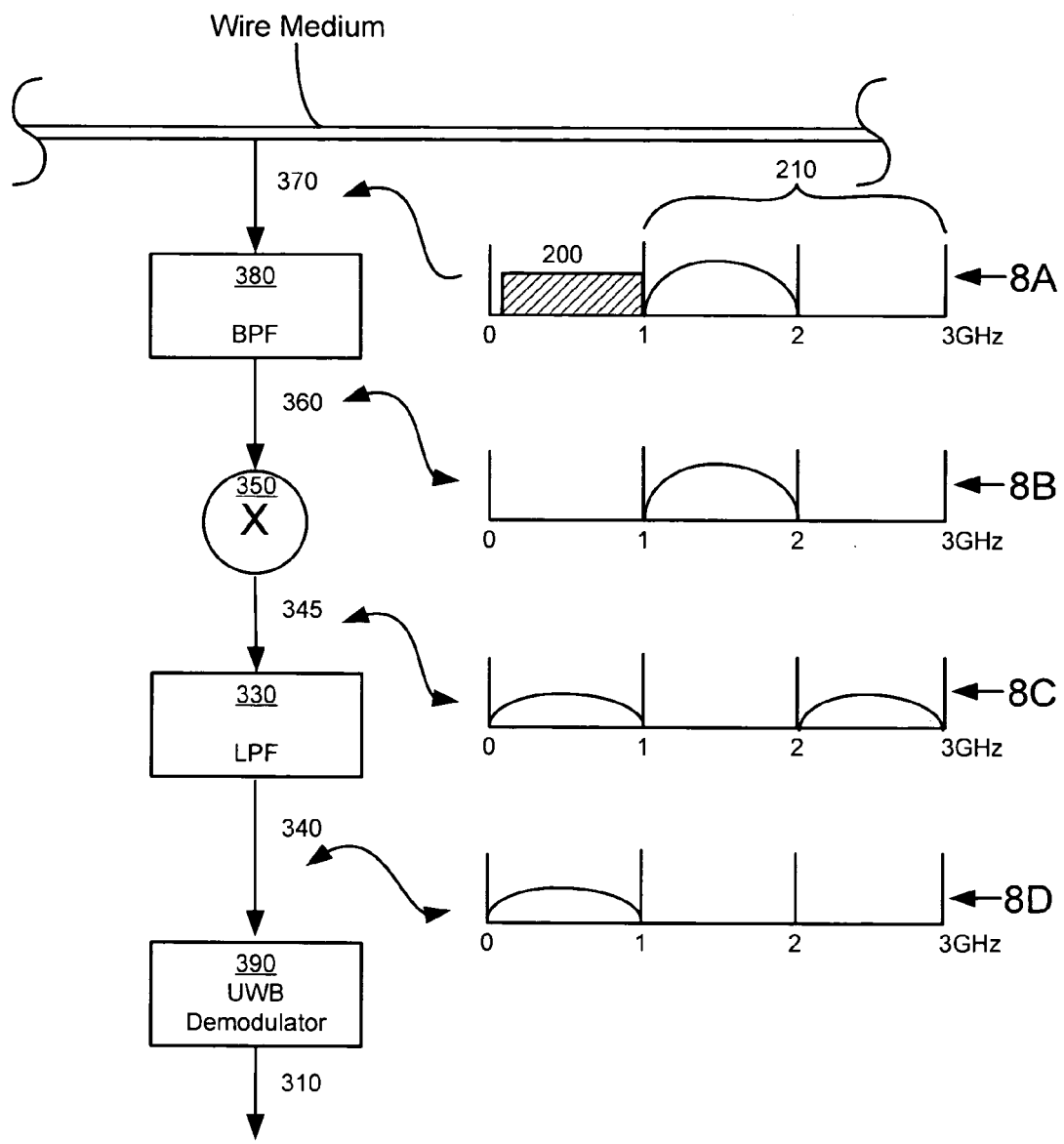
FIG. 8 illustrates a method of the invention that obtains ultra-wideband pulses from a wire medium.

Referring now to FIG. 8, a method for recovering the bits 310 is illustrated. The total signal 370 that includes both CATV channel content in used spectrum 200 and the upward shifted UWB pulses 360 in unused spectrum 210 is obtained from the wire medium, as shown in FIG. 8A. It is passed through a band-pass filter (BPF) 380 structured to pass frequencies between about 1 GHz and 2 GHz, thus eliminating the CATV channel content in used spectrum 200 and isolating the upward shifted UWB pulses 360 in unused spectrum 210, as shown in FIG. 8B. It will be appreciated that BPF 380 may be structured to pass other frequencies of interest, such as any group of frequencies between 1 GHz to 10 GHz.

The upward shifted UWB pulses 360 are then mixed by mixer 350 with a sinusoid of frequency $\omega_c$=1 GHz producing UWB copies 345 in the frequency ranges of about 0 to 1 GHz and about 2 to 3 GHz, as shown in FIG. 8C. Passing the UWB copies 345 through a low-pass filter (LPF) 330 produces the filtered UWB pulses 340, as shown in FIG. 8D, which are demodulated by UWB demodulator 390 to recover the original bits 310. Bits 310 comprising video, images, audio, data and text may be transmitted as shown in this embodiment substantially simultaneously and without interfering with content present in the used spectrum 200.

Figures 9A, 9B, 9C:
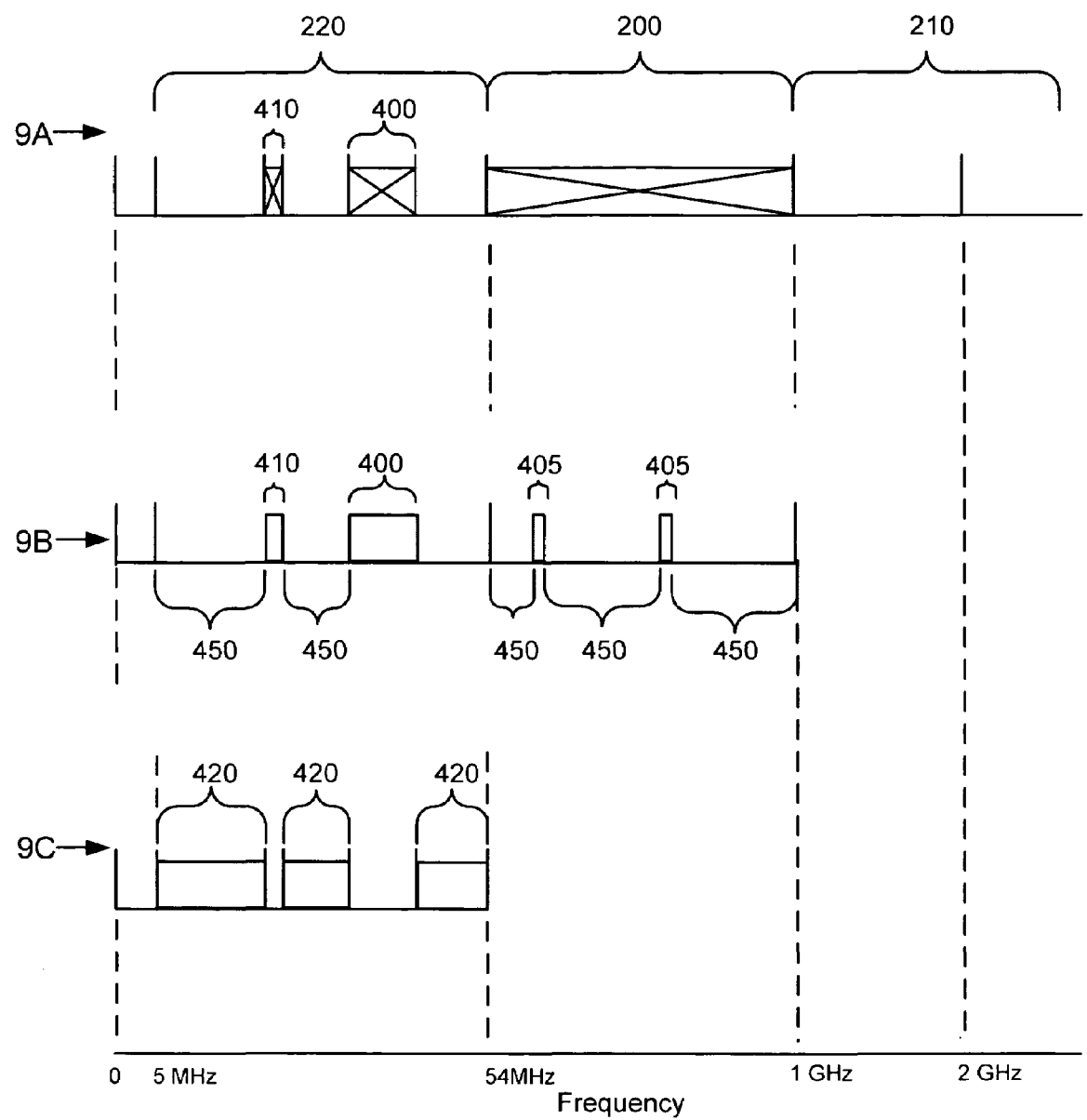
FIGS. 9A–C illustrates a portion of the radio frequency spectrum including examples of several radio frequency bands that may be used by one embodiment of the present invention.

Referring to FIGS. 9A and 9B, another embodiment of the present invention utilizes the lightly used spectrum 220 that is generally used for "upstream" communications. This spectrum spans about 5 MHz to about 54 MHz, and may include a TV-IF band 400. The TV-IF band usually occupies about 6 MHz of radio frequency spectrum. "IF" stands for "intermediate frequency", a middle range frequency to which received signals are down-converted in the electronic circuitry of a television ("TV"), and in which the majority of signal amplification, processing, and filtering steps occur. In addition, there may be one or more upstream channels, or bands 410 used for upstream communications. Within this embodiment, as shown in FIG. 9C, bits 310 are modulated into ultra-wideband (UWB) pulses occupying substantially the entire lightly used spectrum 220 between about 5 MHz and about 54 MHz. The UWB pulses are passed through a bandpass filter structured to pass unused frequencies 420 so that the UWB pulses do not interfere with any upstream channels 410 or the TV-IF band 400. That is, UWB pulses may occupy portions of the lightly used spectrum 220 that are not used by the CATV network.

Figure 10:
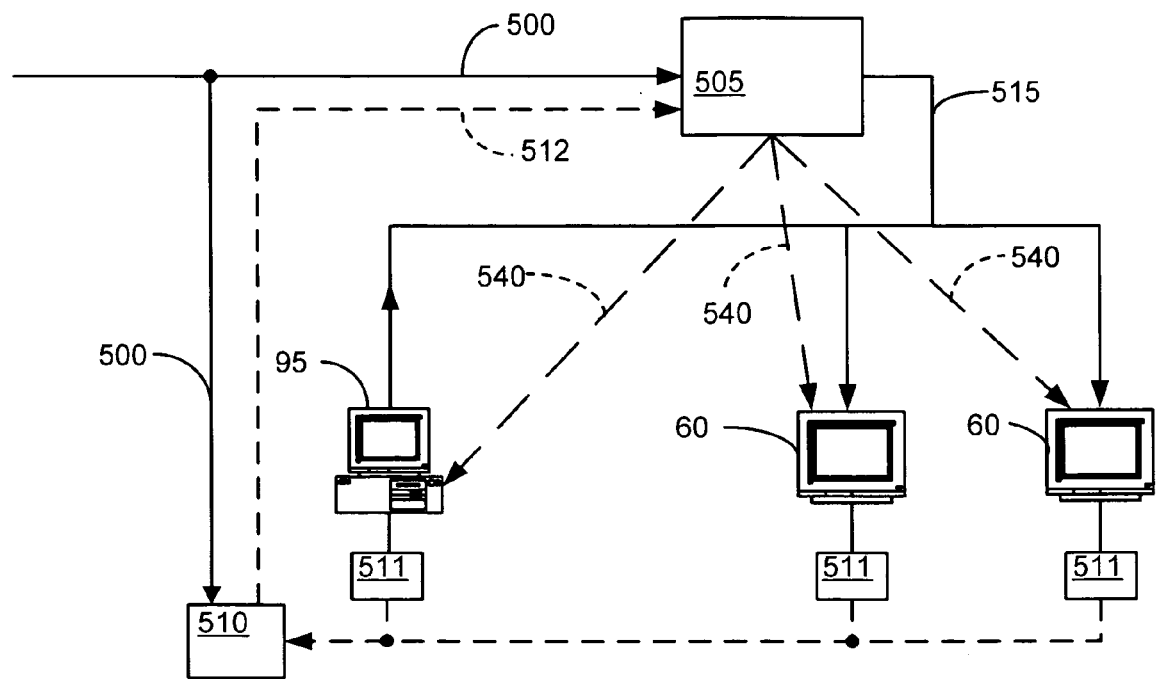
FIG. 10 illustrates one example of the customer/subscriber premises shown in FIGS. 3 and 4, including a dynamic filter constructed according to one embodiment of the present invention.

Referring now to FIGS. 9B and 10, another embodiment of the present invention is illustrated that utilizes substantially all of the CATV bandwidth, which comprises used spectrum 200 and lightly used spectrum 220. In this embodiment, ultra-wideband pulses are transmitted using not-in-use frequencies 450, that avoid in-use frequencies 405. FIG. 10 illustrates a portion of a network, such as a CATV network, employing televisions 60 and/or computers 95 that may use different frequencies at different times. Both TVs, or TV monitors 60 and computers 95 may include ultra-wideband transceivers, or may have "set-top-boxes" or other devices that include ultra-wideband transceivers. For example, in a CATV network, the TV's 60 may display one, or two TV channels. A computer 95 may also display one, or two TV channels. According to this embodiment of the present invention, downstream CATV signals 500 are routed into a dynamic filter 505 that is configured to dynamically pass frequency content corresponding to displayed TV channels. The displayed channels are identified by channel detector 510 that determines which TV channels are being displayed by devices 60 and 95, and forwards this displayed TV channel information 512 to the dynamic filter 505.

The dynamic filter 505 filters the CATV signal, producing a filtered CATV signal 515 that comprises the specific channels requested by devices 60 and 95. In this embodiment, devices 60 and 95 may have the capability to communicate with each other, the dynamic filter 505 and the channel detector 510 using UWB pulses. The devices 60 and 95 receive command information 540 containing in-use, or displayed channel identities from the channel detector 510. The command information 540 may be transmitted, for example, using UWB pulses over the cable network or wirelessly.

As shown in FIG. 10, one embodiment of a channel detector 510 comprises a passive electromagnetic sensor 511 and a wireless UWB transmitter (not shown). Sensor 511 captures the electromagnetic field emissions containing the content of any displayed channel 512 and transmits this information wirelessly to the channel detector 510. The channel detector 510 also receives the CATV signal 500 and performs a correlation between the captured emissions received from the sensor 511 and the various channels contained in the CATV signal. From the correlation, the displayed channel(s) 512 are determined, and this information is transmitted to the dynamic filter 505.

For example, when a user selects a new CATV channel for display on device 60 or 95, the channel detector 510 detects the instantaneous absence of the previously displayed channel on the device 60 or 95, and immediately transmits this new display information 512 to the dynamic filter 505 directing the dynamic filter 505 to pass the new requested channel to device 60 or 95. At substantially the same time, the ultra-wideband pulses are transmitted using the new not-in-use frequencies 450, that avoid the new in-use frequencies 405 that correspond to the newly displayed CATV channel.

Bits 310, carried by ultra-wideband pulses may then be passed to the devices 60 and 95 using radio frequencies, or channels that are not being displayed by devices 60 and 95. The additional bits 310 may carry other information, such as security video information that may be displayed within a discrete "pop-up" window on device 60 and 95. Or bits 310 may be used to transmit Internet data, HDTV-formatted video, or other data.

Figure 11:
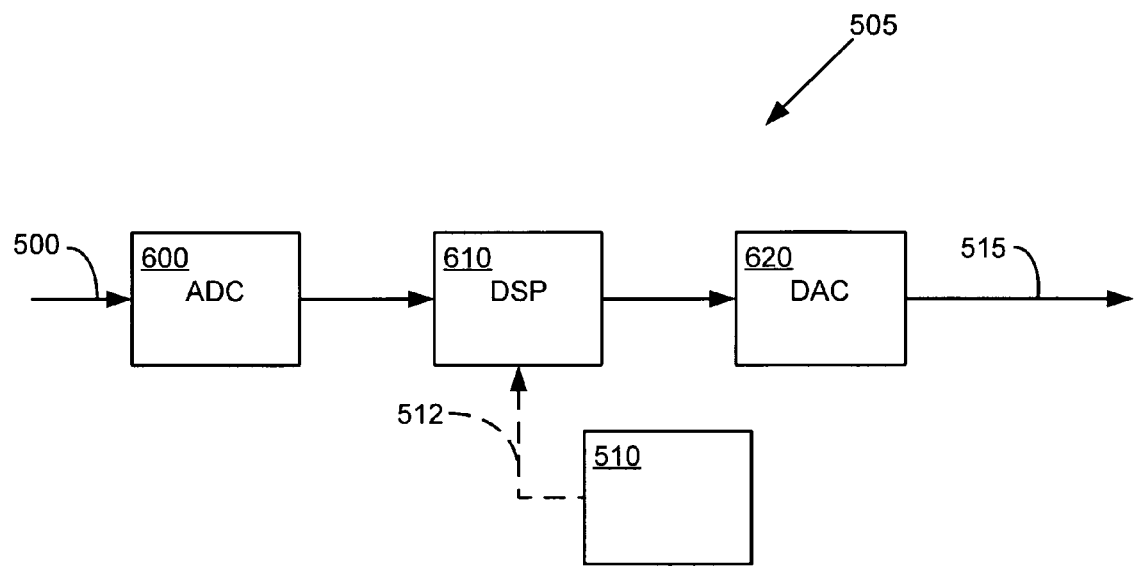
FIG. 11 illustrates one embodiment of the dynamic filter shown in FIG. 10.

Referring now to FIG. 11, one embodiment of the dynamic filter 505 is illustrated. The CATV signal 500 is received by an analog-to-digital converter (ADC) 600. The resulting digital signal is passed to a digital signal processor (DSP) 610 that functions as a dynamic bandpass filter to reject all frequency content other than the frequency bands corresponding to CATV channels displayed by devices 60 and 95. The channel detector 510 passes to the DSP 610 the display channel 512 information which the DSP 610 uses to determine the frequencies, or channels for filtering. The filtered digital signal generated by the DSP 610 is passed to a digital-to-analog converter (DAC) 620 that generates the filtered CATV signal 515.

Figure 12:
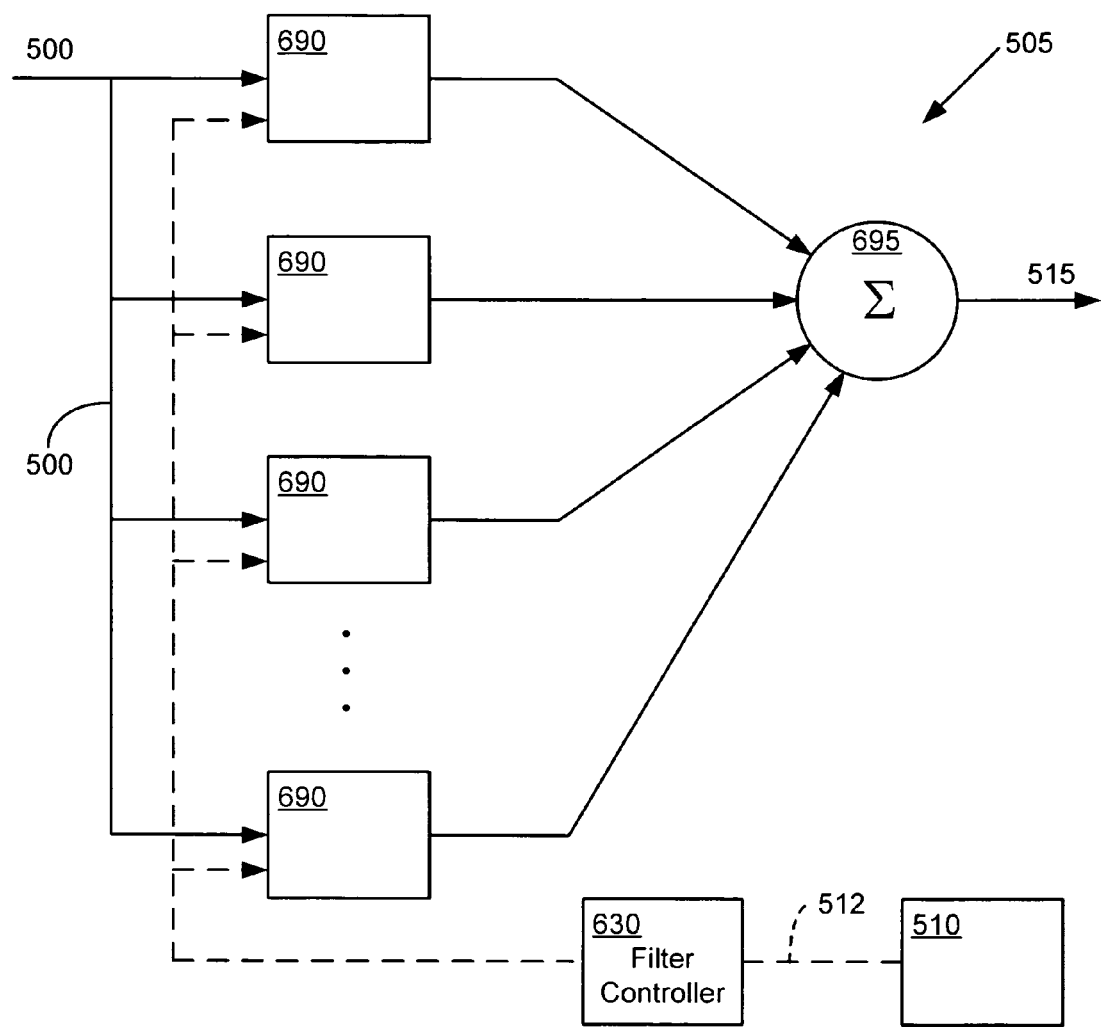
FIG. 12 illustrates a second embodiment of the dynamic filter shown in FIG. 10.

Referring to FIG. 12, another embodiment of the dynamic filter 505 is illustrated. This embodiment is based on using multiple filters 690. Preferably, each filter 690 is a bandpass filter. In this embodiment, the CATV signal 500 enters a bank of filters 690 arranged in a parallel architecture. The number of filters 690 may depend on several factors, including but not limited to expense, performance, or capacity requirements of the deployed invention. Each filter 690 is dynamically configured by a filter controller 630 to pass frequency content corresponding to a single CATV channel displayed by a device 60 or 95. The filter controller 630 receives displayed channel 512 information from the channel detector 510 and uses it to configure each filter 690 in the bank, one filter 690 for each displayed channel on the cable network. If there are fewer channels being displayed by devices 60 or 95 on the network than the number of filters 690, then each of the filters 690 not required for channel filtering is configured to block all remaining channels in the CATV signal 500. The output from each filter 690 comprises either the signal content for a single channel or a null signal comprising no energy. The output from all of the filters 690 is summed by summer 695, resulting in filtered signal 515 comprising the in-use, or displayed channel content with substantially all other content eliminated. Since each in-use channel on the cable system requires a bandpass filter, the number of bandpass filters may be determined, for example, by anticipating the number of connected devices 60 and/or 95 requiring channel content.

Figure 13:
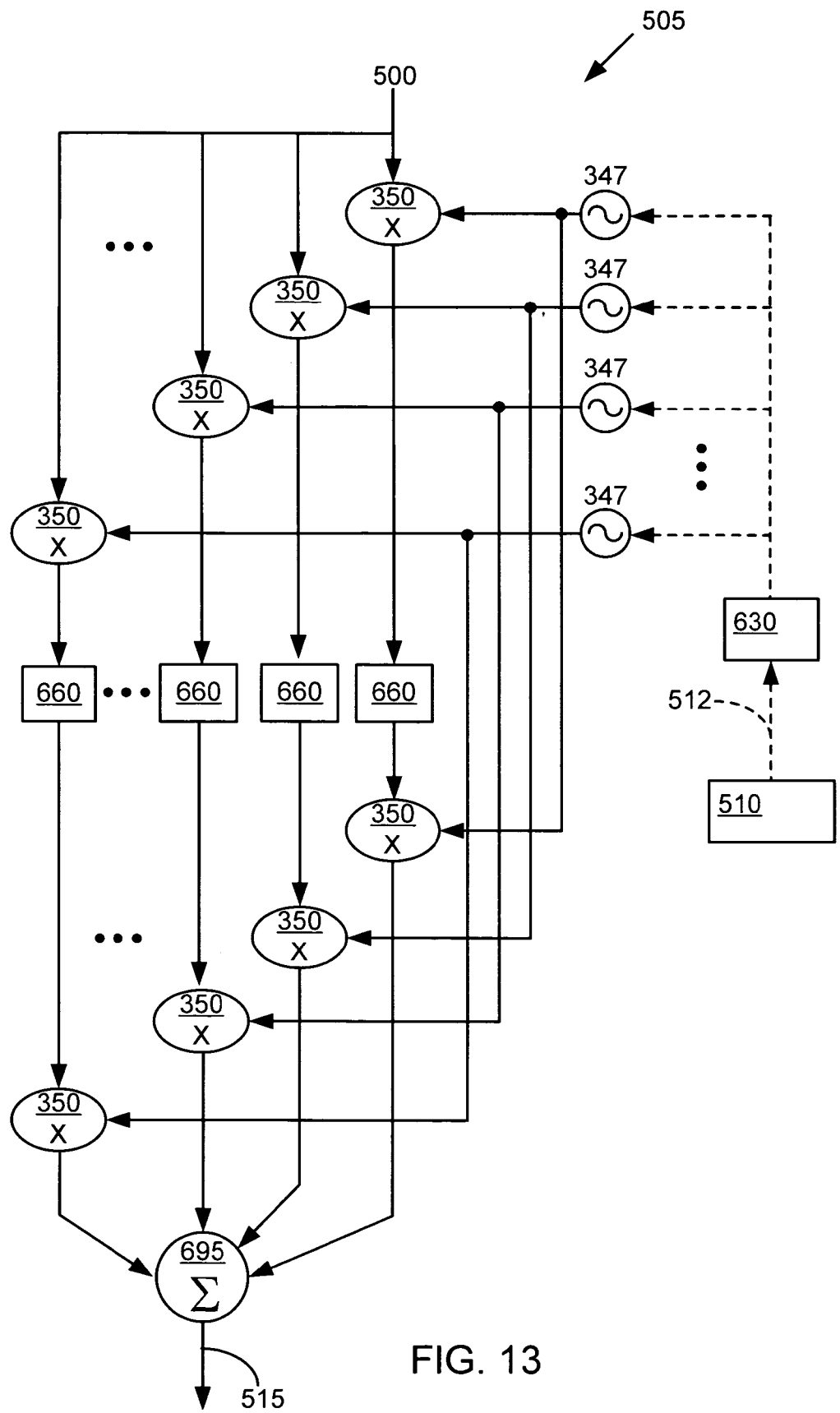
FIG. 13 illustrates a third embodiment of the dynamic filter shown in FIG. 10.

FIG. 13 illustrates another embodiment of the dynamic filter 505. The CATV signal 500 enters a parallel bank of processing streams, wherein each processing stream comprises the steps of: 1) mixing the CATV signal 500, with mixers 350 with a sinusoid equal to the center frequency of one of the in-use, or displayed CATV channels, produced by controllable sinusoid generators 347; 2) routing the resulting frequency-shifted signals into gated lowpass filters 660 structured to reject all frequency content greater than the bandwidth of the displayed cable channel; 3) mixing the resulting, filtered baseband signal (using mixers 350) with a sinusoid identical to the sinusoid of step (1); and 4) summing (using summer 695) the output from each mixer 350 to generate a composite signal 515 containing substantially only the channels in use, or displayed on the network, with substantially all other frequency content eliminated.

Displayed channel 512 information identifying the CATV channels in use by the devices 60 and/or 95 is routed from the channel detector 510 to the filter controller 635. The filter controller 635 routes a control signal uniquely associated with one in-use, or displayed CATV channel to each of the controllable sinusoid generators 347. Each sinusoid generators 347 uses the control signal to generate a sinusoid waveform with frequency equal to the center frequency of one of the in-use, or displayed CATV channels. If there are fewer in-use channels than processing streams, then the gated lowpass filter for each processing stream that is not required for channel processing is set open via a control signal transmitted by the filter controller 635. Since each in-use, or displayed channel on the network requires a single processing stream, the number of processing streams may be determined, for example, by anticipating the number of connected devices 60 and/or 95 requiring channel content.

Another feature of the present invention comprises a synchronization signal, or tone that is broadcast by the subscriber UWB device 50, shown in FIGS. 3 and 4. In one embodiment of this feature of the present invention, a substantially continuous carrier wave, sinusoidal wave, or square wave is broadcast by the subscriber UWB device 50 into any one of: the used spectrum 200, the unused spectrum 210 or the lightly used spectrum 220 shown in FIG. 5. For example, the synchronization signal, or tone that is broadcast by the subscriber UWB device 50 may be transmitted at 750 MHz, 1 GHz, 2 GHz or any other frequency. For example, in one embodiment, the synchronization signal is transmitted at the "guard" frequencies of a CATV network. The "guard" frequencies or band, are bands of frequencies at the upper and lower limits of an CATV channel. In another embodiment, the synchronization signal, or tone is broadcast at an integer multiple of a system clock that is included within the ultra-wideband devices described herein. Preferably the synchronization signal, or tone is broadcast into the CATV, or other type of network using a frequency that does not interfere with CATV content, or other content present in another type of network. However, a specific frequency that previously provided content may be re-assigned to carry the synchronization signal.

The synchronization signal, or tone that is broadcast by the subscriber UWB device 50 enables any ultra-wideband (UWB) devices, or any device that is UWB-enabled (such as TVs 60 or computers 95) to obtain UWB pulse timing synchronization information.

Receiving devices connected to the network may monitor the synchronization signal to synchronize the device's sampling clock with the transmitter's clock. Since the synchronization signal uses a frequency outside of the range of frequencies used by the CATV channels, it causes substantially no interference with the CATV channels and, further, substantially no interference with any UWB pulses present in the network.

Having a synchronization signal provides many benefits. Efficient clock synchronization allows relatively large data payloads per frame while simultaneously allowing more frequent clock adjustments that correct any clock drift. In digital computers or controllers, clocks pace the operation of the device, and thus the communication system. Thus, the UWB-enabled TVs 60 and computers 95 contain clocks that may lose synchronization relative to each other. A synchronization signal that corrects for clock drift improves the efficiency of the communication system.

For example, bits 310 are transmitted in "frames" that comprise groups of UWB pulses. Currently, the beginning portion of each "frame," called a "preamble" contains synchronization patterns, or information. On receiving the preamble, a receiver uses the synchronization pattern to compute any necessary clock adjustment. The clock is not adjusted until the next frame is received, at which time the process is repeated and the receiver's sampling clock is readjusted. A longer period between synchronizations generally equates to more clock drift. Also, the period between synchronizations is generally a function of the amount of data in the "payload" portion of the frame. A large payload per frame increases data rates because of lower computational requirements due to fewer synchronizations, but a increase in data rates come with the risk of synchronization loss, which may cause data corruption, and possibly lower quality-of-service. Conversely, smaller data payloads improve quality-of-service because clock synchronizations are more frequent, enabling clock drift correction before synchronization is lost. Quality-of-service comes at the price, however, of more computational overhead and related latencies, and data rate suffers because of the smaller payloads. By providing a synchronization signal, the present invention allows greater data payloads per frame while simultaneously providing frequent checks, and adjustments for clock drift.

For example, under a pulse-position modulation (PPM) communication scheme, where UWB pulses are placed in specific locations within a "frame," which does not use a synchronization signal as described herein, 400 picosecond UWB pulses are transmitted with a 100 MHz pulse transmission rate, which equates to periods of 10 nanoseconds between pulses, resulting in a 4% duty cycle per pulse (i.e., 400 ps/10 ns). A synchronization signal with a frequency of 1 GHz broadcast into the network oscillates at a rate 10 times the pulse transmission rate. Using a phase locked loop, a device well known in the art for tracking the frequency of a sinusoidal waveform, the receiver component of a UWB device may therefore acquire clock synchronization information from the synchronization signal at 10 times the rate at which it is sampling individual UWB pulses on a 4% duty cycle. The receiver in a UWB-enabled device, like TVs 60 and computers 95 may therefore maintain their clock frequency precisely, eliminating the need to synchronize between frame deliveries. The requirement for discrete frames of data that have synchronization patterns contained in their preambles is significantly reduced, therefore allowing UWB devices to transmit data frames of arbitrary length, considerably improving data throughput. That is, by providing a synchronization signal according to one embodiment of the present invention, relatively large data payloads per frame may be transmitted while simultaneously enabling more frequent clock checks and adjustments that compensate for clock drift.

Thus, it is seen that an apparatus and method for transmitting and receiving ultra-wideband pulses through a wire medium is provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above-described embodiments will fall within the literal and/or legal scope of the following claims, and the present invention is limited only by the claims that follow. It is noted that various equivalents for the particular embodiments discussed in this description may practice the invention as well.

What is claimed is:

1. A communication method for a wire medium, the method comprising the steps of:
    transmitting a carrier wave signal that occupies a first portion of a radio frequency spectrum; and
    transmitting a plurality of ultra-wideband pulses that occupy a second portion of the radio frequency spectrum.

2. The communication method of claim 1, wherein the first portion of the radio frequency spectrum and the second portion of the radio frequency spectrum comprise different radio frequencies.

3. The communication method of claim 1, wherein the carrier wave signal comprises a substantially continuous sinusoidal wave.

4. The communication method of claim 1, wherein the first portion of the radio frequency spectrum ranges from about 5 megahertz to about 500 megahertz.

5. The communication method of claim 1, wherein the second portion of the radio frequency spectrum ranges from about 500 megahertz to about 10 gigahertz.

6. The communication method of claim 1, wherein each of the plurality of ultra-wideband pulses comprises a pulse of electromagnetic energy having a duration that can range between about 0.1 nanoseconds to about 1 microsecond.

7. The communication method of claim 1, further comprising the step of:
    transmitting a synchronization signal within either the first or the second portions of the radio frequency spectrum.

8. The communication method of claim 7, wherein the synchronization signal comprises a substantially continuous sinusoidal wave.

9. The communication method of claim 7, wherein the synchronization signal provides a common timing source.

10. The communication method of claim 1, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, and a coaxial cable.

11. A communication system for a wire medium, comprising:
    a transmitter structured to transmit a carrier wave signal that occupies a first portion of a radio frequency spectrum; and
    an ultra-wideband transmitter structured to transmit a plurality of ultra-wideband pulses that occupy a second portion of the radio frequency spectrum.

12. The communication system of claim 11, wherein the first portion of the radio frequency spectrum and the second portion of the radio frequency spectrum comprise different radio frequencies.

13. The communication system of claim 11, wherein the carrier wave signal comprises a substantially continuous sinusoidal wave.

14. The communication system of claim 11, wherein the first portion of the radio frequency spectrum ranges from about 5 megahertz to about 500 megahertz.

15. The communication system of claim 11, wherein the second portion of the radio frequency spectrum ranges from about 500 megahertz to about 10 gigahertz.

16. The communication system of claim 11, wherein each of the plurality of ultra-wideband pulses comprises a pulse of electromagnetic energy having a duration that can range between about 0.1 nanoseconds to about 1 microsecond.

17. The communication system of claim 11, further comprising a synchronization signal located within either the first or the second portions of the radio frequency spectrum.

18. The communication system of claim 17, wherein the synchronization signal comprises a substantially continuous sinusoidal wave.

19. The communication system of claim 17, wherein the synchronization signal provides a common timing source.

20. The communication system of claim 11, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, and a coaxial cable.

21. A method of transmitting data through a wire network, the method comprising the steps of:
    transmitting a plurality of carrier wave signals that occupy a first portion of a radio frequency spectrum; and
    transmitting a plurality of ultra-wideband pulses that occupy a second portion of the radio frequency spectrum.

22. The method of claim 21, wherein the first portion of the radio frequency spectrum ranges from about 5 megahertz to about 500 megahertz.

23. The method of claim 21, wherein the second portion of the radio frequency spectrum ranges from about 500 megahertz to about 10 gigahertz.

24. The method of claim 21, wherein each of the plurality of carrier wave signals comprises a substantially continuous sinusoidal wave.

25. The method of claim 21, wherein each of the plurality of ultra-wideband pulses comprises a pulse of electromagnetic energy having a duration that can range between about 0.1 nanoseconds to about 1 microsecond.

26. The method of claim 21, further comprising the step of:
    transmitting a synchronization signal within either the first or the second portions of the radio frequency spectrum.

27. The method of claim 26, wherein the synchronization signal comprises a substantially continuous sinusoidal wave.

28. The method of claim 26, wherein the synchronization signal provides a common timing source.

29. The method of claim 21, wherein the wire medium is selected from a group consisting of: an optical fiber ribbon, a fiber optic cable, a single mode fiber optic cable, a multi-mode fiber optic cable, a twisted pair wire, an unshielded twisted pair wire, a plenum wire, a PVC wire, and a coaxial cable.

30. The method of claim 21, wherein the wire network is selected from a group consisting of: a power line, an optical network, a cable television network, a community antenna television network, a community access television network, a hybrid fiber coax system network, a public switched telephone network, a wide area network, a local area network, a metropolitan area network, a TCP/IP network, a dial-up network, a switched network, a dedicated network, a nonswitched network, a public network and a private network.

31. A method of transmitting a plurality of ultra-wideband pulses, the method comprising the steps of:
providing a wire network that uses a group of discrete radio frequencies;
determining which of the discrete radio frequencies are occupied by a carrier wave;
transmitting a plurality of ultra-wideband pulses that occupy the discrete radio frequencies that are not occupied by a carrier wave.

32. The method of claim 31, wherein the step of determining which of the discrete radio frequencies are occupied by a carrier wave comprises sampling each of the discrete radio frequencies to determine if a carrier wave is present.

33. The method of claim 31, further comprising the step of:
transmitting a synchronization signal that occupies at least one discrete radio frequency.

34. The method of claim 33, wherein the synchronization signal comprises a substantially continuous sinusoidal wave.

35. The method of claim 33, wherein the synchronization signal provides a common timing source.

36. The method of claim 31, wherein each of the plurality of ultra-wideband pulses comprises a pulse of electromagnetic energy having a duration that can range between about 0.1 nanoseconds to about 1 microsecond.

* * * * *